United States Patent [19]

Anderson et al.

[11] Patent Number: 5,342,431
[45] Date of Patent: Aug. 30, 1994

[54] METAL OXIDE MEMBRANES FOR GAS SEPARATION

[75] Inventors: Marc A. Anderson; Elizabeth T. Webster, both of Madison, Wis.; Qunyin Xu, Plainsboro, N.J.

[73] Assignee: Wisconsin Alumni Research Foundation, Madison, Wis.

[21] Appl. No.: 987,891

[22] Filed: Dec. 7, 1992

Related U.S. Application Data

[60] Continuation-in-part of Ser. No. 756,395, Sep. 9, 1991, Pat. No. 5,269,926, and a continuation-in-part of Ser. No. 654,150, Feb. 11, 1991, Pat. No. 5,169,576, which is a division of Ser. No. 425,668, Oct. 23, 1989, abandoned.

[51] Int. Cl.$^5$ .................................. B01D 53/22
[52] U.S. Cl. ................................. 95/45; 96/4; 96/10
[58] Field of Search .......... 55/16, 68, 158, 524; 95/45; 96/4.10

[56] References Cited

U.S. PATENT DOCUMENTS

| | | | |
|---|---|---|---|
| 2,627,933 | 2/1953 | Teter | 55/158 |
| 3,892,580 | 7/1975 | Messing | 106/41 |
| 3,940,912 | 3/1976 | Buchner | 55/16 |
| 4,151,060 | 4/1979 | Isenberg | 55/16 X |
| 4,158,621 | 6/1979 | Swift et al. | 208/114 |
| 4,483,694 | 11/1984 | Takamura et al. | 55/16 X |
| 4,584,280 | 4/1986 | Nanao et al. | 501/80 |
| 4,764,357 | 8/1988 | Sherif et al. | 423/338 |
| 4,781,734 | 11/1988 | Behr et al. | 55/16 |
| 4,784,880 | 11/1988 | Coplan et al. | 427/245 |
| 4,800,051 | 1/1989 | Yan | 264/56 |
| 4,801,399 | 1/1989 | Clark et al. | 252/315.01 |
| 4,888,033 | 12/1989 | Charpin et al. | 55/16 X |
| 4,902,307 | 2/1990 | Gavalas et al. | 55/16 |
| 4,929,406 | 5/1990 | Abe et al. | 264/45.5 |
| 4,981,676 | 1/1991 | Minet et al. | 55/16 X |
| 5,006,248 | 4/1991 | Anderson et al. | 210/500.25 |
| 5,028,568 | 7/1991 | Anderson et al. | 501/12 |
| 5,035,784 | 7/1991 | Anderson et al. | 204/158.14 |
| 5,069,794 | 12/1991 | Haag et al. | 55/16 X |
| 5,108,465 | 4/1992 | Bauer et al. | 55/16 |
| 5,110,478 | 5/1992 | Haag et al. | 55/16 X |
| 5,139,540 | 8/1992 | Najjar et al. | 55/16 |
| 5,139,541 | 8/1992 | Edlund | 55/16 |
| 5,160,352 | 11/1992 | Najjar et al. | 55/16 |
| 5,160,713 | 11/1992 | Mazanec et al. | 55/16 X |
| 5,162,301 | 11/1992 | Reich et al. | 55/16 X |
| 5,169,576 | 12/1992 | Anderson et al. | 264/43 |
| 5,171,449 | 12/1992 | Pasternak et al. | 55/16 X |
| 5,183,482 | 2/1993 | Najjar et al. | 55/16 |
| 5,196,380 | 3/1993 | Shadman | 55/16 X |

FOREIGN PATENT DOCUMENTS

| | | | |
|---|---|---|---|
| 0362898 | 4/1990 | European Pat. Off. | 55/16 |
| 0458217 | 11/1991 | European Pat. Off. | 55/16 |
| 3918190 | 12/1990 | Fed. Rep. of Germany | 55/16 |
| 2177881 | 11/1973 | France | 55/16 |
| 55-119420 | 9/1980 | Japan | 55/16 |
| 57-207533 | 12/1982 | Japan | 55/16 |
| 59-177117 | 10/1984 | Japan | 55/16 |
| PCTUS/880-2537 | of 0000 | PCT Int'l Appl. | |
| WO89/00983 | 2/1989 | PCT Int'l Appl. | |
| 0604826 | 9/1978 | Switzerland | 55/16 |

OTHER PUBLICATIONS

Asaeda, M. and Du, L. D., "Separation of Alcohol/Water Gaseous Mixtures by Thin Ceramic Membrane," *J. Chem. Eng. Japan* 19[1]:72–77 (1986).

(List continued on next page.)

*Primary Examiner*—Robert Spitzer
*Attorney, Agent, or Firm*—Quarles & Brady

[57] ABSTRACT

A method for permformation of a microporous ceramic membrane onto a porous support includes placing a colloidal suspension of metal oxide particles on one side of the porous support and exposing the other side of the porous support to a drying stream of gas or a reactive gas stream so that the particles are deposited on the drying side of the support as a gel. The gel so deposited can be sintered to form a supported ceramic membrane having mean pore sizes less than 30 Angstroms and useful for ultrafiltration, reverse osmosis, or gas separation.

1 Claim, 3 Drawing Sheets

OTHER PUBLICATIONS

Anderson, et al., 39 *J. Memb. Sci.*, 243–258 (1988).

Chen, K. C., et al., "Sol–Gel Processing of Silica: 1. The Role of the Starting Compounds," *J. Non–Crystalline Solids* 81:227–237 (1986).

Coplan, M. J., "Endotreating: A New Approach to Composite Membranes," Paper presented at 8th Annual Membrane Technology/Planning Conference, Oct. 15–17, 1990, Newton, Mass.

Johnson, D. W., "Sol–Gel Processing of Ceramics and Glass," *Am. Ceram. Soc. Bull.* 64[12]:1597–1602 (1985).

Kamiya, K. et al., "Preparation of $TiO_2$ Fibers by Hydrolysis and Polycondensation of $Ti(O-i-C_3H_7)_4$", *J. Chem. Eng. Japan* 19[1]:72–77 (1986).

Leenaars, A. F. M. and Burggraar, A. J., "The Preparation and Characterization of Alumina Membranes with Ultra-Fine Pores Part 4. Ultrafiltration and Hyperfiltration Experiments," *J. Memb. Sci.* 24:261–270 (1985).

Yoko, T. et al., "Photoelectrochemical Properties of $TiO_2$ Films Prepared by the Sol-Gel Method," *Yogyo-Kyokan-Shi* 95[2]: 13–17 (1987).

Yoldas, B. E., "A Transparent Porous Alumina," *Am. Ceram. Soc. Bull.* 54[3]: 286–280 (1975).

Yoldas, B. E., "Alumina Sol Preparation from Alkoxides," *Am. Ceram. Soc. Bull.* 51[3]:289–290 (1975).

Yoldas, B. E., "Preparation of Glasses and Ceramics from Metal-Organic Compounds," *J. Mater. Sci.* 12:1203–1208 (Jun. 1977).

METAL OXIDE MEMBRANES FOR GAS SEPARATION

This invention was made with United States Government support awarded by the Department of Energy (DOE), Grant Nos. DE-AS07-86ID26 and DE-FC07-88ID12778, the Environmental Protection Agency (EPA), Grant No. R813457-01-1; and the National Science Foundation (NSF), Grant No. CES-8504276. The United States Government has certain rights.

CROSS REFERENCE TO RELATED APPLICATION

This application is a continuation-in-part of application Ser. No. 07/756,395 filed Sep. 9, 1991, now U.S. Pat. No. 5,269,926, and of application Ser. No. 07/654,150 filed Feb. 11, 1991, now U.S. Pat. No. 5,169,576, which was a divisional of application Ser. No. 07/425,668 filed Oct. 23, 1989, now abandoned.

FIELD OF THE INVENTION

The present invention relates to the general field of porous ceramic membranes and relates, in particular, to a method for depositing metal oxide ceramic membranes having very small pore sizes onto porous supports, and the products produced by the method.

BACKGROUND OF THE INVENTION

Porous ceramic membranes are durable film materials having a variety of industrial and scientific uses, the most common of which is use in separation processes. Although organic membranes are currently used most often for industrial separation processes, metal oxide ceramic membranes offer several advantages over organic membranes. Metal oxide ceramic membranes have a greater chemical stability, since they are resistant to organic solvents, chlorine, and extremes of pH, to which organic membranes may be susceptible. Ceramic membranes are also inherently more stable at high temperatures, to allow efficient sterilization of process equipment not possible with organic membranes and to allow for operation at these elevated temperatures, e.g., above 200° C., at which no organic membrane can function. Metal oxide ceramic membranes are also entirely inorganic, so they are generally quite stable and resistant to microbial or biological degradation which can occasionally be a problem with organic membranes.

The nature of the material results from the general procedure for making such membranes. Metal oxide ceramic membranes are formed through a process beginning with organic-inorganic molecules which are formed into small metal oxide particles, then fused into a unitary ceramic material. On a microscopic level, the materials may be conceptualized as a series of generally uniform spherical particles which are arranged in a close packing model, with the junction points between the spherical particles being fused together. The result is a durable inorganic, homogenous, amorphous to crystalline material which has a relatively uniform distribution of pores, with the pores being determined by the size of the particles forming the membrane. The gaps between the fused particles form a series of pores so that the membrane is porous. The smaller the size of the particles, the smaller the holes left between them, when the particles are packed together and fused.

The general approach to the manufacture of metal oxide ceramic membranes consists of a sol-gel process.

In the sol part of the process, a dilute colloidal solution or suspension of metal oxide particles is created. The metal oxide is typically initiated into the process as a metal alkoxide dissolved in an alcohol solvent. The introduction of the metal alkoxide to water with rapid stirring results in the hydrolysis of the metal to metal hydroxide monomers, dimers, polymers, and/or particles, depending on the quantity of water used. Insoluble metal oxide particles are then peptized by the addition of an acid which causes the particles of the metal oxide to have a greater propensity to remain in suspension, presumably due to charges acquired by the particles during the peptizing process. This process is one of charge stabilization. Stabilization could also be accomplished sterically by adding surfactant agents. Care must be taken at this stage to prevent accretion of large particles, if a small pore size is desired in the membrane. Alternatively, an aqueous sol may be produced by hydrolyzing a metal alkoxide or a metal salt.

Then, under very tightly controlled conditions, the alcohol or aqueous solvent is removed from the colloidal sol, resulting in a semi-solid phase of material known as a xerogel or gel. The gel is typically a translucent or transparent semi-solid material which will retain its shape, but is still relatively deformable. Removal of the remaining water and solvent, and sintering of the gel results in a durable rigid ceramic material which can either be formed as an unsupported membrane or as a supported membrane coated onto a substrate, which, in turn, can be either porous or non-porous, and metallic or non-metallic, depending on the particular application.

One desirable metal element for use in such a metal oxide ceramic membrane is titanium. Titanium is attractive since it has catalytic and photocatalytic qualities that make a titanium oxide ceramic membrane useful for chemical or photoelectrochemical processes in which a less catalytic or photocatalytic metal oxide ceramic membrane would not be suitable. Also, titanium oxide ceramic membranes are typically transparent or lightly colored, thereby giving them desirable optical properties for certain applications in which transparency is an asset.

Practical limitations on the use of such metal oxide ceramic membranes have included the absolute size and the range of size of the pores which can be created in the metal oxide membranes. Clearly, if a membrane is to be used for filtration or other form of separation, the size and the variance in size of the pores through the membrane are a critical factor in the suitability of the membrane for the particular separation function desired. There must be limitations on the heat of the sintering process, since too high a temperature will destroy the pores, but, within a wide range, a porous ceramic material can be created as a supported or as an unsupported membrane.

At least one teaching is known, by the inventors here, of a method for preparing polymeric or particulate titanium ceramic membranes by a process which allows the reproducible and predictable fabrication of titanium ceramic membranes and which permits crack-free membranes of predictable qualities to be created. As disclosed in international published PCT patent application WO 89/00983, the method for creating particulate ceramic membranes involved the use of relatively large amounts of water and a mild heating during the peptizing step to create the appropriately charged particles which could then be dewatered and sintered to create a titanium oxide ceramic membrane.

The method for creating the polymeric ceramic membranes included strictly limiting the amount of water included in the reaction vessel so as to foster the creation of covalent bonds between the titanium and oxygen molecules in the suspension, and also required the use of an alkyl alcohol different from the alkyl alcohol in the titanium alkoxide for the process to be effective.

Certain attention has been directed toward the creation of porous ceramic membranes with exceedingly small pore size. An example of such research is disclosed in U.S. Pat. No. 5,006,248. Similar work is described in Anderson et al., *Journal of Membrane Science,* 39, pp. 243-458 (1988). The process described in the above patent enables the creation of porous ceramic membranes with small pore sizes, either as supported or unsupported materials.

Metal oxide ceramic membranes of transition metals can also be used for catalytic purposes. U.S. Pat. No. 5,035,784 describes how such materials can be used under ultraviolet light to degrade polychlorinated organic chemicals. Doping can be utilized in mixed membrane materials to increase electrical conductivity for various catalytic purposes. U.S. Pat. No. 5,028,568 describes the doping of titanium membranes with niobium to achieve increased electrical conductivity.

Practical utility of ceramic membranes requires large, thin, crack-free surfaces which can be difficult to reliably make in the unsupported form, due to the frailty of the ceramic material. Therefore, supported membranes are more practical for most applications. Traditionally, the accretion or layering of such very small size ceramic particles onto a porous substrate has turned out not to be a trivial endeavor. Such particles tend to accrete, or deposit, on a substrate in an irregular manner resulting in nonhomogeneous thickness. The pores of the substrate which the microporous membrane must span are much larger than the colloidal particles which make up the membrane itself. In addition, the surface topography and electrochemical character of the substrate can adversely affect the deposition of the particles in the accumulating membrane on the substrate. Since the object of depositing such a membrane on a porous substrate is to create a material which can be used for filtering, a highly uniform size distribution of pores in the resulting porous ceramic membrane and a thin, uniform thickness of the membrane are desired.

SUMMARY OF THE INVENTION

The present invention is summarized in that a microporous optically transparent membrane which has an average pore diameter of less than 40 Angstroms is formed on a porous substrate by passing a dilute colloidal suspension of metal oxide particles through one side of a porous support and evaporating solvent from the suspension by means of gas flow on the opposite side of the porous support, so as to deposit the particles in the colloidal suspension as a gel among the pores on the opposite side of the porous support, followed by careful drying of the gel to form a xerogel, and sintering of the xerogel to create a porous metal oxide ceramic membrane.

The present invention is also summarized in that a method for creating a particulate metal oxide ceramic membrane of defined very small pore size includes creating a metal alkoxide in which the alkoxyl group has a branched structure and at least four carbon atoms, dissolving the created metal alkoxide in an alcohol solution with a very limited amount of water, very slowly evaporating the alcohol from the suspension thus created, and firing the resulting gel to create a particulate metal oxide ceramic membrane having pore sizes defined by the molarity of the metal in the beginning alcohol and the molar ratio of water to metal alkoxide molecules.

It is an object of the present invention to allow the creation of metal oxide ceramic membranes in general, and titanium oxide ceramic membranes in particular, which have a relatively small pore size, but which can be created in an efficient and predictable manner.

It is an object of the present invention to enable the reliable and convenient construction of a microporous metal oxide ceramic membrane deposited on a porous support which is useful for very critical filtration operations, such as ultrafiltration, reverse osmosis, and gas separation. The small-pore size membranes may also be useful for ceramic membrane reactors, in catalysis, photocatalysis, and in sensor and waveguide applications.

It is yet another object of the present invention to provide a process having great utility in ultra-filtration, reverse osmosis, gas separations, and other separation technologies in offering significant advantages over use of other prior membranes used for these purposes at present.

It is another object of the present invention in that it does not involve difficult or costly equipment and can be readily adapted for most manufacturing operations.

Other objects, advantages and features of the present invention will become apparent from the following specification when taken in conjunction with the accompanying drawings.

DETAILED DESCRIPTION OF THE INVENTION

The present invention is directed to a process for gas separations, ultra-filtration, reverse osmosis and the like using a preparation of a ceramic metal oxide membrane from a colloidal suspension ("sol") formed of very small particles. The membranes formed from such a sol have very small pore diameters of less than 40 Angstroms because the rate of formation of, or the ultimate size of, the metal oxide particles in the sol is carefully limited. The present invention is also directed toward the creation of a microporous metal oxide particulate ceramic membrane coated onto porous supports which can be used as an excellent filter for separation of small molecules either in gas or liquid phases.

The process by which the particles forming the microporous ceramic membrane may be deposited on the porous substrate is referred to here as permformation. The term permformation is a coined term, combining "formation" with "permeation," to describe the process by which the particles ultimately forming the membrane are deposited on the support. In its most general terms, a colloidal suspension or sol of metal or metal oxide particles is passed through a porous support. On the far side of the porous support a gas stream causes the evaporation of the solvent and the deposition of the particles in the pores of the support. Capillary action continues to draw the colloidal suspension into the support as the solvent evaporates. The result is the deposition of a layer of colloidal particles in the pores of and/or on the surface of the porous substrate, adjacent to the interface where the gas stream is causing the solvent to evaporate. This process of preferential deposition allows one to directly control the thickness of the resulting gel film, by varying the concentration of the sol and the rate of evaporation of the solvent, and by controlling the temperature and relative humidity of the drying gas. If the structure of the porous support is isotropic, the thickness of the gel will be uniform within the entire drying surface, and the thickness can further be controlled by the length of time that the process is performed. Subsequent controlled drying of the deposited gel film particles in the face of the porous support, and firing of the gel, can lead to a crack-free ceramic membrane of uniform thickness and of uniform porosity in a reproducible, reliable and efficient manner.

Figure 1:
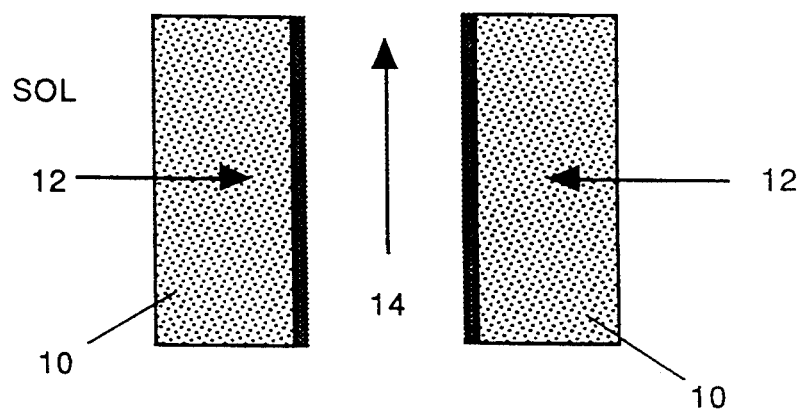
FIG. 1 is a schematic illustration illustrating the concept of the process of the present invention.

FIG. 1 illustrates the general concept of permformation. The dilute sol is placed on a first side of the porous support indicated at 10 in FIG. 1. The porous support 10 is, in the first embodiment described herein, a hollow cylinder. Since a section of the porous support 10 is viewed in cross-section in FIG. 1, two opposite sections of the support are visible, with the sol located on the outside of the support and the gas stream passing vertically in the hollow center. The dilute sol is drawn by capillary flow, indicated by the arrow 12, through the porous support. On the opposite side of the porous support, in its center, a flow of a gas stream is directed as indicated at 14. The gas stream can be a drying gas such as a stream of air or, to prevent unavoidable reactions, an inert gas such as nitrogen, or one of the noble gases. The gas stream can also be a stream of a reactive gas, such as $H_2S$ or $NH_3$, which would also cause deposition of the metal particles as well as evaporation of the solvent. The gas stream and the vapor from the solvent is exhausted and the particles remaining from the dilute sol are deposited in and on the far face of the porous support. As indicated in FIG. 1, which is a cross-sectional view of a porous tube used as a support, the membrane may be deposited on both interior surfaces of the cylindrical porous support.

Figure 2:
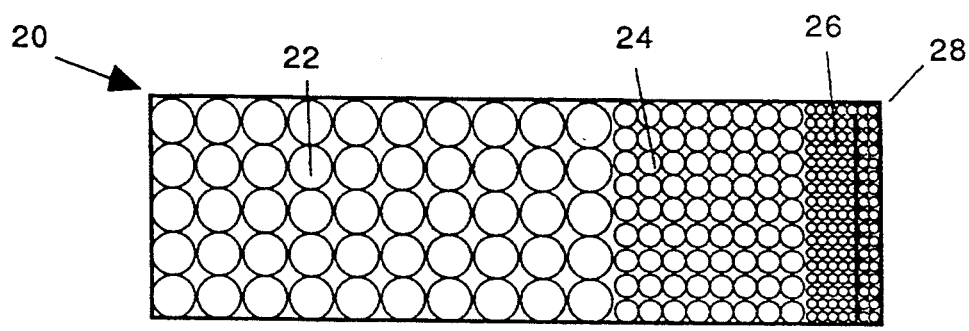
FIG. 2 is another schematic illustration of the concept of the process of the present invention.

Illustrated in FIG. 2 is a detailed schematic diagram intended to convey the conceptual context of the permformation ceramic membrane product made by the present invention as used with a particular support. The method is intended to deposit a microporous membrane on one surface of a support which is already porous. The cylindrical porous support which has been utilized for the examples described below is itself composed of several layers of particulate materials, which have been sintered into a unitary material. In this example, the support material is made of alumina particles which have been slip-cast in a series of layers of particles of varying size. The particular porous support used is formed of three layers of alpha-alumina of varying size ranges. This porous support is indicated at 20 in FIG. 2. This porous support is available as a cylindrical assembly from United Filter. The alpha-alumina support is composed of three layers of varying particle diameter and pore size. The largest layer has a thickness of 1.6 mm and a pore diameter of between 10 and 15 microns. That layer, referred to as the substrate, is indicated at 22. The second layer, denominated as first intermediate layer 24, is approximately 0.02 mm thick and has a pore diameter of 0.8 microns with a porosity of 40%. The third layer, denominated the second intermediate layer 26 here, is the innermost layer on the tubular support, and consists of a 0.006 mm layer of particles deposited so as to have a 0.2 micron pore diameter therebetween. The porosity of this layer is approximately 35%. It is the object of the present invention to deposit an even finer layer of microporous ceramic material on such a support. The microporous ceramic membrane layer is indicated at 28 in FIG. 2. The microporous ceramic membrane layer 28 is formed within, and perhaps extending to the surface of, the second intermediate layer 26. The microporous membrane 28 can be thought of as a series of very small particles deposited as a matrix or web in the pores of the inner portion of the second intermediate layer 26. The layer 28 thus includes both the particles of the support with 0.8 micron pores therebetween, and the microporous ceramic membrane deposited in the pores to reduce the mean pore diameter to the range of 5 to 40 Angstroms. It is this ultrafiltration, gas separation, or reverse osmosis layer 28, which is deposited by the method utilized in the present invention.

While the three-layer alpha-alumina support described is a particularly advantageous one for use within the practice of the present invention, other porous supports may also be used. Other porous supports which are readily amenable for use in the permformation method include stainless supports, sintered metal supports, porous glass (such as Vycor), fibrous mats, or one of a line of ceramic filters sold under the Anotec trade name. The porous support thus does not have to itself be formed of sintered particles. While one embodiment here utilizes a cylindrical support, many other physical configurations of the porous support are possible, such as the flat plate in the alternative embodiment. The apparatus for performing the process must be modified, depending on the shape of the support, so that the sol is on one side of the support and the gas stream is on the other side.

Figure 3:
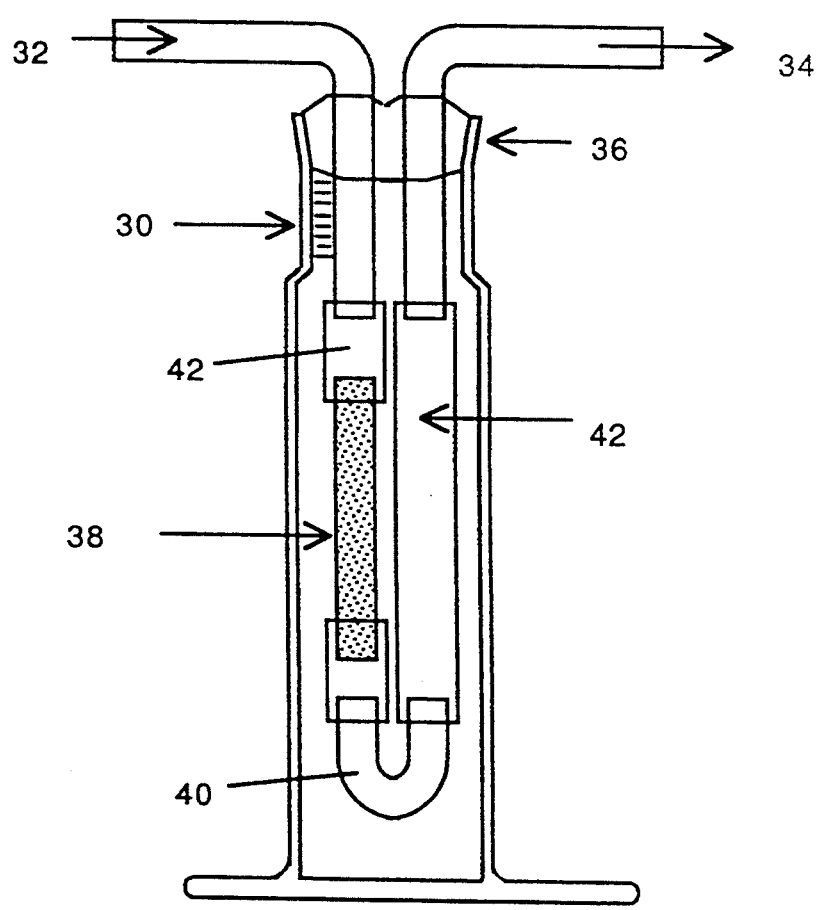
FIG. 3 illustrates one embodiment of an apparatus which may be used to perform the process of the present invention.

Shown in FIG. 3 is a first embodiment apparatus useful for performing the permformation in accordance with the present invention. In FIG. 3, the reaction vessel is indicated at 30. A gas stream enters through an input port 32 and the gas stream exits, together with the vapor of the solvent, at an exit port 34. A stopper 36 seals the interior of the reaction vessel 30 to the atmosphere. Within the reaction vessel 30, connected to suitable tubing to the input and the output ports, is the cylindrical porous support, indicated at 38. A U-shaped glass fitting 40 is located at the bottom of the apparatus, and pieces of Tygon tubing are indicated at 42, to connect to the input output ports 32 and 34. Tygon is a convenient material, but any tubing impermeable to the solvent will suffice. The appropriate quantity of sol is placed in the reaction vessel 30, filling up the vessel to the neck thereof. To operate the vessel, the gas stream is continually supplied through the input port 32, and exhausted through the output 34, thereby slowly drawing down the sol by evaporating the solvent therefrom. As the solvent evaporates, the metal oxide particles are deposited on the inner face of the porous support 38. In this embodiment, the exterior of the cylindrical support 38 serves as the sol side of the support and the interior face of the support acts as the deposition side.

Figure 4:
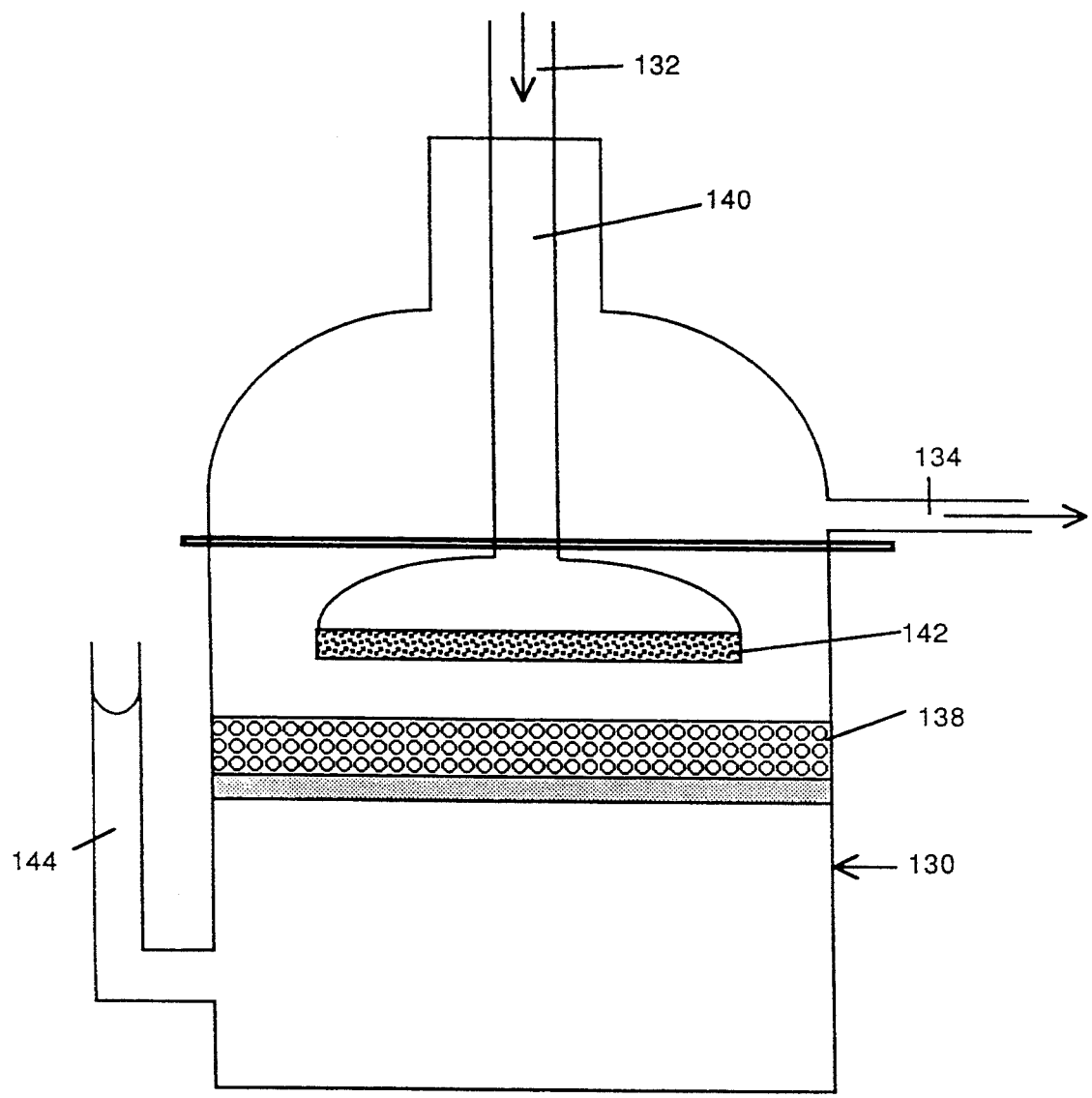
FIG. 4 illustrates another embodiment of an apparatus which may be used to perform the process of the present invention.

Other embodiments of the apparatus for performing the process are also possible. For example, a variant of the reactor of FIG. 3 has been assembled in which the cylindrical porous support 38 is oriented horizontally rather than vertically, so that fluid pressure drop differences over the support are minimized. Also, shown in FIG. 4 is an alternative apparatus for performing the same process with a flat disk-shaped porous support. In the apparatus of FIG. 4, the reaction vessel is indicated at 130. The input gas stream enters through input port 132 and exits through output port 134. The porous support, in this case a porous clay ceramic disk, is indicated at 138. The input gas stream passes through flared tubing 140 until it exits through a glass frit 142 so as to be diffused over the top surface of the support 138. The sol is placed in the reaction chamber 130 which is filled until the bottom of the support is touched by the sol. A graduated leveling chamber 144 permits the sol level to be measured and provides an inlet to add more sol if desired.

In operation, the apparatus of FIG. 4 functions analogously to the apparatus of FIG. 3. The input air stream contacts the upper or deposition side of the support. The sol contacts the lower, or sol, side of the support and is drawn into the support by capillary action. The air stream evaporates solvent on the deposition side of the support thereby depositing the colloidal particles as a gel in the interstices of the support.

It is also envisioned that manipulation of the porous support and/or the gas stream may be appropriate in some instances to achieve good membrane formation at the desired location. Since the sol enters the support from the sol side, care must be taken to prevent deposition of the particles until they reach the deposition side. Therefore, charge attractions between the support and the particles must be minimized. Additional dilution of the sol may also help with this problem. Once support-to-particle attraction is minimized through the support, care must be taken to ensure that deposition occurs as desired on the deposition side. Phosphate treatment of the deposition side may aid in forming charge attraction at that face. The gas stream can include a reactive gas, such as $H_2S$ or $NH_3$, which would change the pH of the sol at the deposition face and thus accelerate deposition of particles. The gas stream could be heated to destabilize the particles in the colloid kinetically to induce deposition. Any or all of these techniques may aid in obtaining better particle deposition preferentially on the deposition side of the support.

In preparing metal oxide membranes using a process that involves first creating a sol, dewatering the sol to a gel, and then sintering the gel into a membrane, the creation of very small particles in the sol by limiting the rate of formation or the ultimate size of the metal oxide particle in the sol is an important factor.

The size of the colloidal particle is the major factor in determining the pore size of the permformed membrane. The thickness of the permformed membrane is determined by the particle size and by the length of time of operation of the process. The Huckel model of an electric double layer "thickness" can be used to estimate the effective particle size. From that size and from the knowledge of the number of metal oxide ions in the sol, the thickness of the resulting xerogel and membrane can be approximated in theory.

The diameter of the particles in the sol can determine the diameter of the pores between particles in the membrane, since the model for the microscopic structure of the membrane is a series of particles of generally spherical shape, which are fused to their neighbors during the sintering process, to form the porous ceramic membrane material. Accordingly, the diameter of the pores is determined by the diameter of the particles, since in a random close packing model of the particles in the membrane, the smaller the particles, the smaller are the pores formed by the gaps or spaces between the particles. The use of the large alcohol group in the metal alkoxide precursor, as described here, is but one method which seems to facilitate the creation of very small particles in the sol stage by limiting the reaction rate of the creation of metal oxide molecular intermediates and thus limits the creation of large particles in the sol. In particular, alcohols of at least four (4) carbon atoms, with a branched structure, such as tert-amyl alcohol, are preferred. The production of small pore ceramic metal oxide membranes is also possible by processes other than those involving large organic alcohols described herein. For instance, such membranes may be formed by dialyzing colloidal suspensions or from very dilute sols which discourage particle-to-particle aggregation.

There is considerable flexibility available with respect to the chemical composition of the sol which is used within the permformation process described herein. Both aqueous and alcoholic sols may be used in the permformation process described here. In addition, the range of available metals and metal oxides is wide as well. Metal oxide ceramic membranes can be made with titania, zirconia, and other transition metal oxides, as well as silica, alumina, and iron oxides. Colloidal metal particles such as tungsten and silver may also be used.

In general, a process for producing alcoholic colloidal sols and membranes with very small pore sizes begins with the creation of a metal alkoxide in which the alcohol moiety in the metal alkoxide is a large, relatively complex, organic alcohol. It has been typical in prior art methods to utilize the commercially available forms of metal alkoxides. For example, one convenient titanium alkoxide commercially available (Aldrich) is titanium tetra-isopropoxide ($Ti(OPr^i)_4$). It has been found here that the substitution of the alcohol in the beginning titanium alkoxide, by substituting tert-amyloxide for isopropoxide, facilitates the creation of small particles in the sol and therefore smaller pore sizes in the resultant titanium ceramic membrane. A similar result has been demonstrated for zirconium as well. Since the phenomenon appears attributable to the relatively large physical size of the alcohol moiety, it would appear that the phenomenon attributable to the creation of the small particle sizes is the effect of the large alcohol moiety in controlling the reaction rate of the creation of metal oxides in the solution by interfering with access to the titanium atom. Accordingly, other large organic alcohols, particularly those of branch shape and having at least four or five carbons, would result in similar control of the reaction rate, and result in the ability to achieve small particle size and small pore size in the membrane.

Since neither titanium nor zirconium tetra-tert-amyloxide is known to be commercially available at present, they must be created from readily available materials. One convenient method for creating titanium or zirconium tetra-tert-amyloxide is by an alcohol exchange method, using the commercially available precursor tetra-isopropoxide. This is done by reacting the titanium (or zirconium) tetra-isopropoxide with tert-amyl alcohol in a benzene solvent to yield titanium tetra-tert-amyloxide and isopropanol. Then by distillation, isopropanol can be removed with the benzene as an azeotrope, and then excess tert-amyl-alcohol and benzene can be removed by distillation.

Once the metal tetra-tert-amyloxide is available, the reaction may proceed. The metal alkoxide and a small amount of water are separately dissolved in equal amounts of alcohol, with the alcohol preferably being the same organic alcohol that is the alkoxyl group in the metal alkoxide. The three other critical parameters appear to be the molar concentration of titanium in the ultimate solution, the molar ratio of water molecules to metal atoms, and the pH of the water. These three parameters are interdependent. Thus for a molarity of metal molecules of 0.2 molar, the ratio of water molecules (pH=2) to metal atoms has been found to be conveniently in the range of 1 to 7 to achieve desirable membranes. However, for higher metal concentrations, i.e. a molarity of titanium of 0.4 molar, then a ratio of water molecules (pH=2) to metal atoms should not exceed about 3 before the reaction ceases to function effectively. The pH of the water is another factor which affects the particle size formed in the sol since the protons act as a catalyst for the hydrolytic reactions. Values of pH in the range of about one to three are preferred, with a lower pH generally resulting in smaller particle size. If the water ratio is too high, or if the molarity of the metal atoms becomes too high, the creation of metal oxide molecules becomes prevalent in the solution and a precipitation results, which yields particles of a size higher than is desired in creating the membrane here. However, by limiting the molarity of the metal and the ratio of water to metal, and by adjusting the pH of the water, the size of the particles can be strictly limited in a way that results in efficient creation of finely porous membranes.

Again, the procedure begins with the dissolving of the titanium or other metal alkoxide and water in separate amounts of the alcohol. The two solutions are then mixed together by dropping the water alcohol part into the alkoxide part. The transparent solution resulting is preferably stirred while the reaction continues. This step may require some time since the reaction rate of the formation of metal oxides has been impeded deliberately in order to prevent the creation of large particles. The result is a transparent solution containing very small suspended metal dioxide particles.

As has been published previously by the inventors of the present specification, it is possible to create both polymeric and particulate titanium ceramic membranes which are porous, stable, and can be made generally crack-free. What has been surprisingly found here is that a process can be defined for making particulate ceramic membranes of very small defined pore diameter using a process that bears much more similarity to the previous process for creating polymeric titanium ceramic membranes than that previously used to create particulate ceramic membranes of titanium. This procedure for making small pore membranes omits the peptizing step normally associated with the creation of particulate metal oxide ceramic membranes. The small particles here are formed directly from the hydrolytic reaction by using a limited amount of water. However, this alcoholic sol still results in a particulate membrane, presumably since the large alcoholic group in the metal alkoxide precursor prevents the partially hydrolyzed intermediates from polycondensation which is the key route to forming polymeric chains.

While the method for making small pore size membranes and the product disclosed herein are illustrated in particular with metal oxide ceramic membranes of titanium, zirconium, and a mixture of the two, it has been described previously by others in the field that methods proven to be effective with titanium may also be adapted for use with other metallic oxides, such as oxides of silicon, aluminum, niobium and other transition metals. Thus the method and product of the present invention has utility for other metals as well, although titanium is considered one of the more difficult metals to work with, of the metals useful for creating metal oxide ceramic membranes, and titanium has particularly unique qualities advantageous in a metal oxide membrane, due to its catalytic and photocatalytic characteristics, not present in some other metal oxides which might also be used in such a membrane.

A procedure for forming aqueous colloidal sols involves producing metal hydroxide particles from metal alkoxides by hydrolysis in an acidic aqueous solvent with a basic chemical such as NaOH or $NH_4OH$. After stirring the hydrolyzing metal into a homogenous sol, the non-metal hydroxide products are removed by washing or dialysis. Metal hydroxide particles remain in suspension in very acidic aqueous solutions.

To convert the resultant alcoholic or aqueous sol into a gel, the solvent must be removed from the solution. However, the process must be delicately handled in order to avoid concentrating the very small particles into larger particles than is desired. It has been found that slow evaporation in a humidity controlled box is a sufficiently slow process to produce clear gels at room temperature. The dried gels then can be fired in air at temperatures not to exceed 400° C. to sinter the gel into a titanium dioxide particulate membrane. It has been further found that during firing the heat of the sintering oven must be raised very slowly in order to prevent carbon deposition on the membrane during firing.

The precursor sols can be tested for the particle size by quasi-elastic light scattering techniques. Using such a technique it has been found that the particles in the sol have a diameter which can be varied down to less than 5 nanometers. The use of transmission electron microscopic imaging of the dried gel has revealed that the dried gel is composed of quantum sized particles having a size of less than 3 nanometers. BET measurements of the resulting membrane fired to 250° C. have indicated that membranes can have a mean pore diameter as small as 14 Angstroms with an extremely narrow distribution of pore size. The BET results also indicate that a large surface relatively low porosity (39%) relative to the theoretical area (in excess of 200 square meters per gram) and a low porosity of about 30% can be achieved in such a membrane. By altering the ratio of water to metal and by altering the molarity of metal in the beginning solution, the diameter of the particles in the solution, and the resulting diameter of the pores in the membrane, can be controlled between 5 and 40 Angstroms in a relatively efficient manner. It has also been found that polymeric gelation is completely prevented by the steric effect of the large alcohol group on polycondensation reactions. Particles of different size ranges, in the range of 2 nanometers (20 Angstroms) to 300 nanometers, can be harvested by quenching the particle growth at certain stages using polymeric stabilizing agents, such as polyethylene glycol and hydroxypropyl cellulose. In this fashion tailor-made membranes with desirable pore sizes throughout the range can be obtained by gelatinizing corresponding particle sols. The lower range limit on the size of the pores in such a membrane is difficult to ascertain due to difficulties in measurement of the pores, but particles sized so as to give rise to pores as small as 5 Angstroms in diameter have been achieved.

In order to maintain preferential deposition of the colloidal particles at the mouth of the support pore, the interactions between the particles and the support walls, and interactions between the particles themselves, must be kept to a minimum until the particles reach the surface where deposition is desired. It is for this reason that a dilute sol may preferably be used in order to minimize interactions between the particles themselves. A sol which is sufficiently dilute such that the average spacing between particles is significantly larger than the size of the particles themselves achieves this objective. Using an orthorhombic (8 nearest neighbor) configuration as a model for the distribution of sol particles within the sol, it is possible to determine the average separation distance between the nearest neighbor particles. For example, the molarity necessary to achieve a required separation distance between the particles has been calculated in the following Table 1. The particle spacing factor is designated "n" and the molarity necessary to achieve an n of 1, 5 or 10 is disclosed for two diameters of particles. The results are given in terms of the molarity necessary to achieve the desired separation of particles to avoid these interactions.

TABLE 1

| | Molarity of Sol to Achieve Particle Separation | | | |
|---|---|---|---|---|
| pH | Diameter of particles (nm) | n = 1 | n = 5 | n = 10 |
| 8 | 25 | 1.4 | 0.011 | 0.0014 |
| 2 | 12 | 12 | 0.098 | 0.012 |

Following the permformation procedure, the deposited gelled colloidal particles must be dried to form a xerogel. This is done by critically slow drying, to remove the remaining solvent contained within the xerogel without cracking it. To reduce the drying rate in the bore of the support, i.e. at the gel surface, the configuration of the permformation may be reversed. The glass U-tube 42 at the bottom of the apparatus is filled with solvent, and the inlet and outlet ports 32 and 34 are then sealed. This procedure is intended to result in a 100% relative humidity environment inside the drying loop. The sol reservoir is then emptied, and left open to ambient humidity conditions. The relative humidity gradient thus imposed across the wall of the support is the reverse from that experienced during the permformation process. This relative humidity gradient imposed across the support causes the meniscus of the sol to recede toward the outer surface of the support. A typical drying time would be one to two days.

The dried xerogels can then be fired in ambient air conditions. Firing conditions for the supported membranes typically involve a relatively gradual heating rate of 2° C. per minute until a maximum temperature of 400° C. is reached. Previously experiments have indicated that using mixed metal oxide ceramic membranes, firing temperatures of up to 600° C. can be used for some membranes, though typically firing ranges between 400° and 600° C. are common. The tube is maintained at the peak firing temperature for a time period, typically four hours, and then is cooled to room temperature again in a controlled rate of descent of approximately 2° C. per minute.

The result of the performation process is a microporous metal oxide ceramic membrane deposited on the support which gives the material great strength and rigidity. The microporous membrane is actually deposited within the pores of the support and perhaps extending over the deposition side of the support as well. The material thus formed is suitable for fine filtration operations, notably for ultrafiltration, reverse osmosis, gas separation, and molecular sieving. Since the size of the pores can be readily manipulated within a narrow range, by tightly controlling the size of the particles used to form the membrane, permformed membranes can be designed and constructed according to desired specification. Such materials can be used for gas separations, liquid filtrations, and separations of materials from solvents, such as desalination of sea water. The materials can also be used in catalytic membrane reactors and for catalysis in general.

Titanium oxide and other metal oxide porous ceramic membranes containing small pores, with a relatively narrow distribution of pore size, offer several unique advantages for industrial application. Because the metal oxide ceramic materials are highly durable, the membrane is an attractive candidate for carrying out high pressure reverse-osmosis type processes, such as producing ultrapure water and the desalinization of sea water. Since it has been previously demonstrated that titanium in a titanium oxide ceramic membrane retains its catalytic ability, such a titanium oxide ceramic membrane can be used both as a catalyst or catalyst support and can speed up certain reactions by removing unwanted by-products due to the separation functions. It has previously been demonstrated that membranes of this type are photochemically active and are capable of degrading complex organic molecules such as polychlorinated biphenyls and other environmental contaminants and of separating gaseous mixtures.

The process of the present invention can also be better understood with reference to the following examples which are intended to be illustrative and not limiting.

EXAMPLES

Particulate TiO$_2$ Membranes

First, a supply of the precursor tert-amyloxide was prepared from commercially available materials. As is shown in Equation 1, titanium tetra-isopropoxide (Aldrich) was converted by an alcohol exchange reaction to titanium tetra-tert-amyloxide. This reaction was conducted by the method described by Bradley, et al., *J. Chem. Soc.*, 2027 (1952). The titanium tetra-isopropoxide was reacted with tert-amyl alcohol (t-AmOH) (Aldrich) in a benzene solvent to yield titanium tetra-tert-amyloxide and isopropanol (i-PrOH). The isopropanol was then removed from the solution by distillation with benzene as an azeotrope at 71.4° C. The removal of the isopropanol was believed necessary to complete the formation of the tetra-tert-amyloxide. Excess t-AmOH and benzene were then removed via additional distillation at above 100° C. The NMR spectrum of the resulting light yellow product was taken to confirm that no isopropanol remained. There may have been trace amounts of t-AmOH in the product.

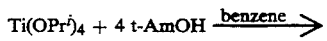

$$Ti(OPr^i)_4 + 4\ t\text{-AmOH} \xrightarrow{\text{benzene}}$$
$$Ti(OAm^t)_4 + 4\ i\text{-PrOH(benzene)} \quad \text{Equation 1}$$

All other chemicals were used without additional purification.

The preparation of the sol was begun by dissolving the titanium alkoxide and acidified water in equal amounts of alcohol. The water was previously acidified to a pH of 2. The desired concentration of the titanium in the solution and the molar ratio of water to titanium in the solution were calculated in advance. Based on a calculation of a molar level of 0.2 M of titanium and a molar ratio of water to titanium of 6 to 1, 1.19 grams of $Ti(OAm^t)_4$ were dissolved in 7.5 ml of AmOH while 324 μl of $H_2O$ was introduced into 7.5 ml of AmOH as well. The water fraction was then introduced into the titanium alkoxide fraction by dripping while stirring. The dripping occurred over a fifteen minute time interval at room temperature. While the resulting solution appeared visibly transparent, light scattering measurements indicated small particles (having a diameter less than 5 nm) in suspension. The solution, which was 0.2 M titanium tetra-tert-amyloxide and 1.2 M $H_2O$, was stirred during an aging time of an additional two hours, also at room temperature.

To turn the sol thus produced into a gel, the alcohol was slowly permitted to evaporate from the sol. The solution was placed in plastic dishes for the gelation which was accomplished by placing the dishes in a humidity controlled box, which was simply a conventional desiccator box without either particular instrumentation or mechanism to control the alcohol level in the chamber. After one week, the dishes were checked. Some produced satisfactory gels after one week while others required a longer gelation time. To avoid cracking, the gels were allowed to dry completely before being removed from the box.

The dried gels were then sintered by firing in a ceramic oven in air at up to 400° C. The temperature rise in the oven was controlled to be no more than an increase of 0.1° C. per minute, at least in the temperature range of 190° C. to 350° C., in order to prevent carbon deposition during the firing process. The final firing temperature, i.e. 400° C. was held for about one-half hour. The results were unsupported titanium ceramic membranes which were visibly transparent.

Various measurements were made to gauge the size of the particles during the formation process to gauge the size of the pores in the membrane. The precursor sols were tested by a quasi-elastic light scattering technique and were found to contain $TiO_2$ particles which were less than 5 nanometers in diameter. Transmission electron microscopy of the dried gel revealed that the gel was composed of quantum-sized particles, of less than 3 nm in diameter. BET measurement indicates that one of the membranes, fired at 250° C., has a mean pore diameter of 14 Angstroms with an extremely narrow distribution of pore size. The BET measurement also showed a large specific surface area, i.e. 264 square meters per gram, and relatively low porosity, i.e. 39%.

The same procedure was repeated with the same molarity of titanium in the solution and molar ratios of water to titanium of from 1:1 to 10:1, with best results being obtained at 6:1 for 0.2 M titanium. Ratios in the range of 2:1 to 7:1 yielded reasonable results. With higher levels of water present, the titanium dioxide tended to precipitate, resulting in larger than desired particle size. For 0.4 M titanium, and varied ratios of water to titanium, it was found that water to titanium ratios in excess of 3:1 resulted in precipitation. This critical and interrelated factor appeared to be both the molarity of the titanium and the ratio of water to titanium, with the water ratio needing to be lower if more titanium was present. This observation is consistent with the model that the system is effective in creating small particle size, and small pores, due to the limitation in the availability of the water molecules to the titanium atoms and in the titanium particles to other titanium particles.

Particulate $ZrO_2$ Membranes

Again a supply of the precursor tert-amyl oxide was prepared by an alcohol exchange reaction from commercially available zirconium tetra-propoxide $(Zr(OPr^n)_4)$ (70% propanol, Aldrich) with tert-amyl alcohol (Aldrich) in benzene solvent to yield zirconium tetra-tert-amyloxide and propanol. By distillation, propanol was removed with benzene as an azeotrope at 77.1° C. Complete removal of propanol was desired. Excess benzene was removed by subsequent distillation over 80° C. The yellow solid product was tested by NMR spectrum and found to have in excess of 95% of the propoxyl groups replaced by tert-amyl groups. Thus the equation paralleled equation 1, above, with zirconium substituted for titanium. The product was then mixed with t-AmOH to make a 1.1 M solution.

The zirconium alkoxide and water were separately dissolved in equal amounts of tert-amyl alcohol. The two solutions were then mixed by dropping the $H_2O$ part into the alkoxide part over 15 minutes. Two concentrations of solution were made, one 0.2 M $Zr(OAm^t)_4$ and 0.2 M $H_2O$ and the other 0.1 M $Zr(OAm^t)_4$ and 0.2 M $H_2O$. The solutions were aged by stirring for two hours.

The transparent sols thus produced were then placed in plastic dishes for gelation, which was accomplished by slow alcohol evaporation carried out for about one week in a desiccator box. The gels were then fired in air at up to 400° C. to result in a transparent unsupported $ZrO_2$ membrane. The hydrolyzed clear sols were also used for coating a glass support. A transparent crack-free film seven layers thick, which had a total thickness of about 1 micron, was obtained using a spin-coating technique.

Again measurements were made to ascertain the size of the particles and the pores in the membrane. The precursor sols were tested by a quasi-elastic light scattering technique and found to contain $ZrO_2$ particles having sizes less than 5 nm in diameter. Nitrogen adsorption measurements of the membranes fired between 200° and 350° C. indicated a mean pore diameter of 14 Angstroms. An x-ray diffraction study revealed the membrane to be completely amorphous.

Particulate Mixed Titanium and Zirconium Membranes

Both the titanium tert-amyl alcohol and the zirconium tert-amyl alcohol were prepared from commercial materials by the alcohol exchange methods described above. The metal alkoxides were mixed in ratios of 10% and 20% zirconium. The concentrations of total metal atoms used were half the concentration of water molecules.

An unsupported $Zr_{0.1}Ti_{0.9}O_2$ membrane was made by stirring 540 μl of 1.1 M $Zr(OAm^t)_4$ solution and 1.76 gm $Ti(OAm^t)_4$ into 12.8 ml tert-amyl alcohol, followed by stirring for one hour. Separately 220 μl of $H_2O$ was dissolved in another 15 ml of AmOH. Then the water solution was dripped into the metal solution. The final transparent sol had 0.02 Zr, 0.18 Ti and 0.4 M $H_2O$. The solution was stirred for two hours. The sol was then poured into plastic dishes and placed in a desiccator box for three weeks. The gels were then removed and fired by slow temperature increase (2° C./min) up to 400° C. and baked at 400° C. for one-half hour. The resulting unsupported membranes were transparent. Testing of the sols by quasi-electric light scattering technique indicated Zr-Ti oxide particles having sizes less than 5 nm. The membrane was measured by nitrogen adsorption and found to have a mean pore diameter of less than 16 Angstroms with an extremely narrow pore size distribution. BET results revealed a large surface area of 200-300 $m^2$/gm and a porosity in the range of 30-35%, consistent with the close packing model. X-ray diffraction revealed the membranes to be amorphous.

Supported $Zr_{0.1}Ti_{0.9}O_2$ membranes were made on a glass substrate by first dissolving 1 ml 1.1 M $Zr(OAm^t)_4$ and 3.31 gm $Ti(OAm^t)_4$ into 10.6 ml tert-AmOH, followed by stirring for one hour. Separately 414 μl of $H_2O$ were dissolved in another 15 ml AmOH. The water solution was dripped into the metal alcohol solution with violent stirring. The final transparent sol contained 0.038 M Zr, 0.34 M Ti, and 0.76 M $H_2O$. The solution was stirred for two hours and then coated onto prewashed microscope slides of size 1.3×4 inch (VWR Scientific). One side of the glass slide was coated by spin coating, followed by firing at 200° C. for 15 minutes. Up to seven layers of coating of 1 micron each were made without cracking. Finally the membranes were fired at 550° C. for one hour to make a transparent porous membrane.

The Formation of an Iron Sol

The fabrication of a microporous supported ceramic membrane was begun with the consensus of a metal oxide colloidal solution or sol. The fabrication of an iron oxide ceramic membrane was begun with goethite, which was synthesized from ACS reagent grade chemicals and Milli-Q deionized water. To synthesize the goethite, a solution of ferric nitrate (125 ml, 0.83 M) was passed through a glass microfiber filter to remove dust and undissolved particulates. The ferric nitrate was then partially neutralized by adding NaOH (41.6 ml, 5 M) with rapid stirring. The OH to Fe ratio was calculated to be 2.0. Following some initial precipitation, the ferric nitrate solution resolubilized after about 30 minutes. The ferric nitrate solution was then aged in a shaker at 25° C. in a glass container for 60 hours. After aging, the pH of the solution was 1.4. The partially neutralized ferric nitrate solution was then hydrolyzed by the addition of NaOH (30.2 ml, 5 M), which was added over a 3 minute period in a polypropylene container with vigorous stirring by a Teflon impeller. The pH of the iron solution was thus increased to 12.6 in about 3 minutes. The hydrolyzed iron solution was then aged in a shaker at 60° C. for 6 days. Initially, the color of the iron solution was a dark reddish brown, but after 24 hours in the aging period, the color changed to a light, orange-tan which is indicative of the formation of goethite (FeOOH) particles. Excess electrolytes were removed from goethite sol by repeated washings with Milli-Q water followed by settling and decanting. The washing was continued until no further decrease in the conductivity of the supernatant could be detected. The goethite sol was then ready for use in the permformation procedure.

The Formation of Silica Sol

An aqueous silica sol was synthesized from ACS reagent grade chemicals in Milli-Q deionized water. The process was begun with 4.5 ml of tetraethyl orthosilicate (TEOS) which was added drop-wise to $NH_4OH$ solution (31 ml, 0.5 M) with rapid stirring. Initially, a two-phase mixture was formed, but after stirring for 1 hour the solution became a homogenous silica sol. The sol was transferred to a dialysis membrane (3500 molecular weight cut off) to remove ammonium ion and ethanol which had been formed during hydrolysis. The sol was dialyzed against Milli-Q water until the pH of the sol dropped to below 9. The purified sol was then filtered using glass microfiber paper to remove any dust or particulates. The aqueous silica sol was then ready for use in the permformation procedure.

Formation of Performed Membranes from Aqueous Sols

Both the silica and iron membranes were formed in the apparatus of FIG. 3. The sol was placed inside of the reaction vessel 30. The assembly including the input port and output ports 32 and 34, the porous support 38, the U-shaped fitting 40 and the Tygon tubing 42 was placed as a unit into the reaction vessel, with the stopper 36 sealing the vessel to the atmosphere. A seal was made between the Tygon and the porous ceramic using epoxy resin. Where the ends of the ceramic support were glass-glazed, the epoxy sealant was not used.

A length of nylon thread was inserted between the stopper and the cylinder in the neck to allow pressure equalization as the sol level dropped. In order to minimize subsequent loss of vapor through the neck of the reaction vessel, a paraffin film was wrapped around the stopper joint.

High purity nitrogen gas was used as the drying medium. The nitrogen cylinder and the regulator were attached to the inlet port 32 by a length of Tygon tubing. On the output port 34, 2 humidity indicator cards served as a rough estimate of the humidity of the gas flow stream relevant to ambient conditions.

The length of the permformation operation was determined by measuring the decrease in sol level over time. An average sol evaporation rate was calculated as the change in volume over time for each time period. Based on models of the support pore structure, and the packing of the colloidal particles during gelation, an approximate membrane thickness was calculated. Tables 2 and 3 below set forth the results achieved with the silica sol when deposited through the permformation procedure. The first run was conducted with a highly dilute silica sol (separation factor of 20). The run lasted 27 hours and was intended to produce a 3 micron thick membrane. The second run was conducted with a more concentrated sol (separation factor of 10) and was intended to produce a membrane with a thickness of 8 microns.

TABLE 2

| | Dilute Silica Sol | | |
|---|---|---|---|
| Time | Level of sol (mm) | Rate of deposition (ml/hr) | Thickness ($\mu$m) |
| 0.0 | 42 | | |
| 16.5 | 25 | 0.84 | 2.1 |
| 20.75 | 20.5 | 0.86 | 2.6 |
| 26.5 | 15.0 | 0.78 | 3.3 |

TABLE 3

| | Concentrated Silica Sol | | |
|---|---|---|---|
| Time | Level of sol (mm) | Rate of deposition (ml/hr) | Thickness ($\mu$m) |
| 0 | 39 | — | 0 |
| 2 | 37 | 0.82 | 0.5 |
| 22 | 25 | 0.49 | 3.6 |
| 24 | 23.5 | 0.61 | 4.0 |
| 32.5 | 19 | 0.43 | 5.2 |
| 45 | 12.5 | 0.42 | 6.8 |
| 51.5 | 9 | 0.44 | 7.7 |

Following the permformation procedure, the gelled colloidal particles were dried to a xerogel and fired to create the sintered porous ceramic membrane. The drying step must be done carefully to avoid gel cracking which can be caused by evaporative stress. To reduce the drying rate in the bore of the support, the configuration of the permformer was reversed. The glass-tube was filled with water and the inlet and outlet ports 32 and 34 were sealed. This resulted in a 100% humidity environment inside of the drying loop. The sol reservoir was then emptied and left open to ambient humidity conditions. The relative humidity gradient imposed across the wall of support caused the meniscus of the sol to recede toward the bore surface of the support. Typical drying times were 1 to 2 days. After the membranes were dried, the end seals were removed using a diamond saw.

The resulting dried xerogels were fired in the ambient air. The firing conditions were controlled so that the heating and cooling ramps were 2° C. per minute and with a maximum firing temperature of 400° C. which was held for a duration of 4 hours.

One indication of the successful deposition of the small colloidal particles in the porous support is that the rate of flow of sol through the support decreases over time. It has been found that the rate of flow of sol, as indicated by the rate of solvent evaporation, does decrease over the time of the permformation. The following Table 4 sets forth the decreasing rate of flow measured for a silica sol being deposited in the cylindrical gamma-alumina support.

TABLE 4

| Cumulative Time of Run (min) | Drop in Sol Level (ml) | Incremental Evaporation Rate (ml/hr) | Overall Evaporation Rate (ml/hr) |
|---|---|---|---|
| 0 | .15 | — | — |
| 14 | .43 | 1.20 | 1.20 |
| 29 | .76 | 1.32 | 1.26 |
| 60 | 1.23 | .91 | 1.08 |
| 109 | 1.80 | .70 | .91 |
| 133 | 2.00 | .50 | .83 |
| 225 | 2.60 | .39 | .65 |
| 386 | 3.52 | .34 | .52 |
| 438 | 3.80 | .32 | .50 |

It is expected that the microporous ceramic membranes will have mean pore sizes adjustable in the range of from 5 to 100 Angstroms. Because the membranes are being formed in the pores of a support, overall porosities will be low, typically less than 30%. Microporous membranes with pores less than 100 Angstroms may be used for ultrafiltration while microporous membranes with pore sizes in the 5–40 Angstrom range may be used for reverse osmosis, molecular sieving, and other types of gas separations. Because of the durability of ceramic materials, the membranes should withstand significant pressure drops and be useful for industrial applications.

Formation of Permformed Membranes from Alcoholic Sols (Hypothetical)

Metal oxide membranes can be formed in the apparatus of FIG. 3 from alcoholic sols such as those described in earlier examples directed to production of particulate $TiO_2$, $ZrO_2$, and mixed $Zr_{0.1}Ti_{0.9}O_2$ membranes. Using the permformation, drying, and sintering processes of the previous example, such metal oxide membranes may be deposited on the porous support, dried to a xerogel and fired to form sintered microporous ceramic membranes. It is expected that the microporous ceramic membranes will have mean pore diameters adjustable in the range of from 5 to 100 Angstroms and will be useful for ultrafiltration and gas separation. Membranes with pore sizes in the 5 to 40 Angstrom diameter range may also be used for reverse osmosis and molecular sieving. Molecular sieving in the gaseous phase may be accomplished by permitting a mixture of gases having various molecular radii to flow through the permformed supported membrane. Gases with molecular radii smaller than that of the pores in the membrane pass through the membrane and may be recovered in a purified or partially purified form after passing through.

We claim:
1. A process for separating gases, comprising the steps of:
   (a) providing a microporous metal oxide ceramic membrane performed in the pores of a porous support and having pores averaging less than 40 Angstroms in diameter;
   (b) exposing a mixture of gases of various molecular size and shape against one side of the permformed microporous ceramic membrane under conditions which favor the flow of gases through the membrane;
   (c) excluding one or more species of gas from passage through the membrane because of the size of the pores of the microporous ceramic membrane; and
   (d) recovering at least one partially purified gas which has passed through the membrane.

\* \* \* \* \*